(12) United States Patent
Vaughn

(10) Patent No.: US 7,414,758 B2
(45) Date of Patent: Aug. 19, 2008

(54) FOUR-WAY CALIBRATION OF A DIGITAL CAMERA USING PATCH INFORMATION ACQUIRED FROM A SCENE

(75) Inventor: Michael A. Vaughn, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 941 days.

(21) Appl. No.: 10/210,437

(22) Filed: Aug. 1, 2002

(65) Prior Publication Data

US 2004/0021784 A1    Feb. 5, 2004

(51) Int. Cl.
*H04N 1/04* (2006.01)

(52) U.S. Cl. .................. 358/474; 358/513; 358/909.1; 358/475; 358/906; 348/220.1; 348/221.1

(58) Field of Classification Search .............. 358/474, 358/513, 514, 906, 909.1, 475, 509, 1.9; 348/220.1, 221.1, 187–188, 222.1, 223.1, 348/364, 102; 382/162, 167
See application file for complete search history.

(56) References Cited

U.S. PATENT DOCUMENTS

| 5,148,288 | A |   | 9/1992  | Hannah |
| 5,164,831 | A | * | 11/1992 | Kuchta et al. ............ 348/231.7 |
| 5,414,537 | A | * | 5/1995  | Omuro et al. ............... 358/518 |
| 5,610,654 | A | * | 3/1997  | Parulski et al. ........... 348/229.1 |
| 5,852,675 | A |   | 12/1998 | Matsuo et al. |
| 6,377,300 | B1|   | 4/2002  | Morris et al. |
| 6,766,050 | B1| * | 7/2004  | Saikawa et al. ............. 382/162 |
| 6,961,086 | B1|   | 11/2005 | Ichikawa |
| 7,099,056 | B1| * | 8/2006  | Kindt ......................... 358/509 |
| 7,324,238 | B2| * | 1/2008  | Inoue .......................... 358/1.9 |
| 2002/0021360 | A1 | * | 2/2002 | Takemoto ................... 348/222 |
| 2003/0030648 | A1 | * | 2/2003 | Baer .......................... 345/589 |

FOREIGN PATENT DOCUMENTS

| EP | 0891078    | 1/1999  |
| JP | 11284940   | 10/1999 |
| JP | 2000232653 | 8/2000  |

\* cited by examiner

*Primary Examiner*—Edward L. Coles, Sr.
*Assistant Examiner*—Negussie Worku
(74) *Attorney, Agent, or Firm*—Thomas J. Strouse

(57) ABSTRACT

A method of improving a digital image captured by a digital camera comprising: providing a digital camera having a memory for storing known values of a color chart having a plurality of color patches of different colors and a digital image processor, using the digital camera to capture an image of the color chart to produce image values of the color patches of the color chart; operating the digital image processor to process at least some of the color patch imaged values and the stored known values of the color patches to produce a color correction matrix or profile; and storing the color correction matrix or profile to correct color images subsequently acquired by the digital camera.

6 Claims, 3 Drawing Sheets

FOUR-WAY CALIBRATION OF A DIGITAL CAMERA USING PATCH INFORMATION ACQUIRED FROM A SCENE

FIELD OF THE INVENTION

This invention relates in general to producing improved digital images captured by a digital camera.

BACKGROUND OF THE INVENTION

Digital cameras, such as the Kodak DCS ProBack 645M camera, capture images of a scene using a solid state image sensor, and store the resulting image data on a removable memory device, such as a PCMCIA type III hard drive. Thumbnails of the captured images can be displayed on the camera's color LCD screen. Since scenes can have a wide range of illumination levels, these cameras include automatic exposure controls in order to adjust the camera lens f/number and exposure time to compensate for the scene illumination level. However, because of the varying reflectance levels of objects within a scene, and the limited dynamic range of image sensors, such automatic exposure control often produces unacceptable results for professional photographers.

As a result, such digital cameras include manual exposure overrides. The photographer can review a captured image on the camera's LCD image display to determine if the captured scene appears lighter or darker than desired, adjust the exposure settings, and can take a second picture. However, because of the small size and limited picture quality of the LCD display, it is impossible to make critical exposure judgements using the displayed image. As a result, this method is useful only for providing very coarse exposure adjustments.

Once the images are captured by a digital camera (such as the Kodak DCS 620 or Kodak DCS ProBack 645M cameras), they can be downloaded to a computer and processed and displayed. For example, an image processing program such as Photoshop version 6.0 by Adobe Systems Inc., San Jose, Calif. can be used to display and edit a captured image. Photoshop version 6.0 includes an "info tool" which displays the RGB code values of a particular pixel when the user lingers the cursor over a particular image area. The displayed values are the RGB code values of the processed pixels from the camera, which may include many types of non-linear quantization and processing. As a result, it is not possible to easily relate the RGB code values to the sensor exposure values of the camera when the scene was captured. Furthermore, these displayed code values are available only after the images are downloaded to the computer, and not as the images are being captured.

U.S. Pat. No. 5,414,537, issued May 9, 1995, inventors Omuro et al., discloses a color image processing method and apparatus in which a color image of an object is processed so that the processed image accurately portrays the colors of the object regardless of varying exposure conditions. An object and a color chart that is comprised of a plurality of color chips having known colorimetric parameters are imaged under the same predetermined exposure conditions. Then, colorimetric parameters are determined for each imaged color chip of the imaged color chart. A correlation, between the known and the determined colorimetric parameters, is computed and, on the basis of the captured correlation, the color of the imaged object is corrected. This technique is disadvantageous because it requires user input, is effected in a computer separate from the camera and only corrects for color anomalies.

What is needed is a digital camera that provides an easy way for the photographer to understand the sensor exposure values for different areas of a scene as the scene is captured, so that any desired exposure corrections can be made automatically and the scene can be immediately recaptured.

SUMMARY OF THE INVENTION

According to the present invention, these needs are satisfied.

According to a feature of the present invention, critical scene content from a captured digital image of a color target is selected and is provided information necessary for color, linearity, channel and exposure correction.

According to another feature of the present invention there is provided a method of improving a digital image captured by a digital camera comprising: providing a digital camera having a memory for storing known values of a color chart having a plurality of color patches of different colors and a digital image processor; using said digital camera to capture an image of said color chart to produce image values of said color patches of said color chart; operating said digital image processor to process at least some of said color patch imaged values and said stored known values of said color patches to produce a color correction matrix or profile; and storing said color correction matrix or profile to correct color images subsequently acquired by said digital camera.

ADVANTAGEOUS EFFECT OF THE INVENTION

The invention has the following advantages.

1. A photographer can immediately utilize correction information for all images taken in a given venue.

2. The correction information from color targets which are well known and used by professional photographers are utilized.

3. Correction information for the creation of image processing parameters that can be used continually and updated as the photographer needs are utilized.

DETAILED DESCRIPTION OF THE INVENTION

Figure 1:
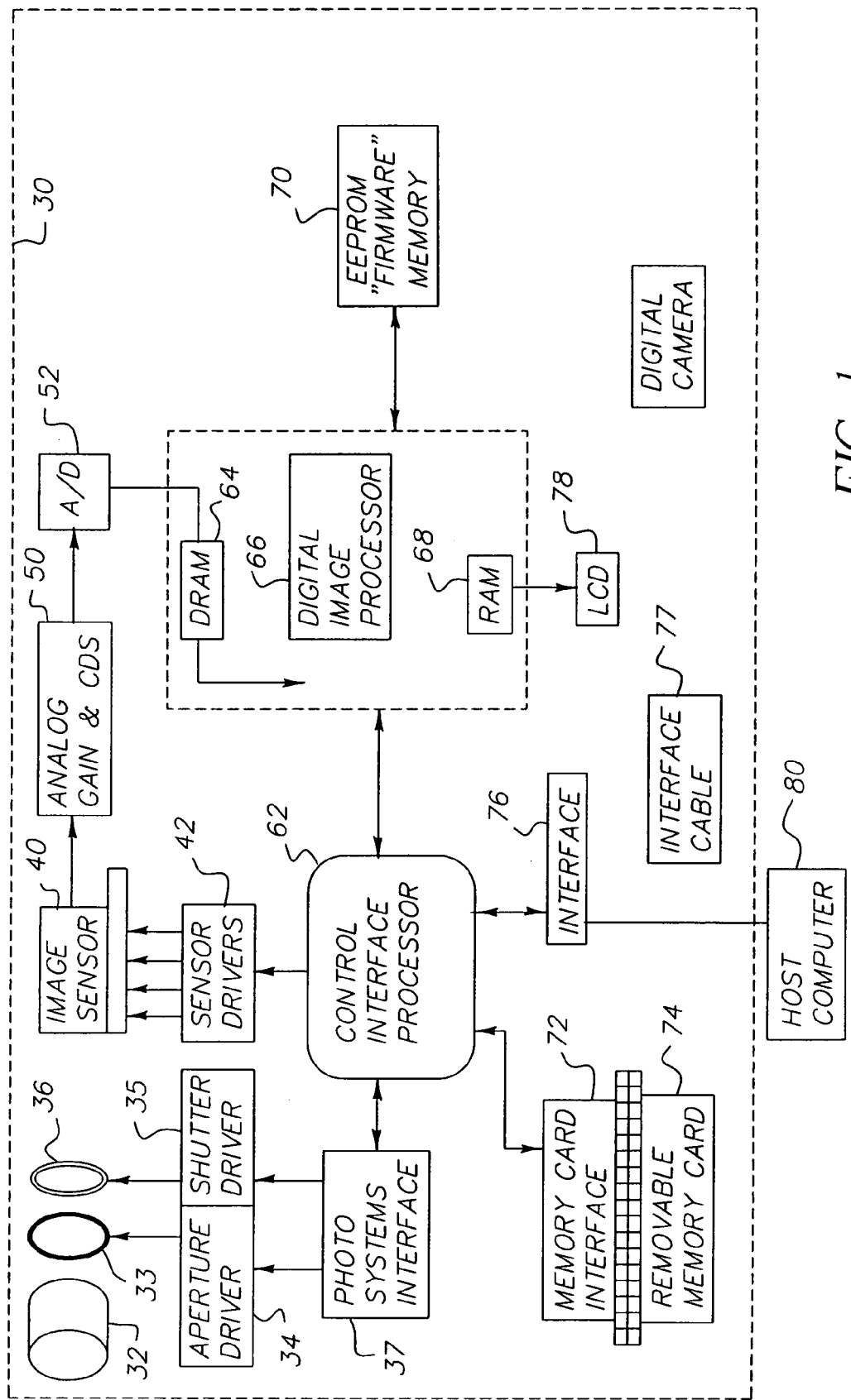
FIG. 1 is a block diagram showing an exemplary digital camera which implements the method and incorporates the apparatus of the present invention.

FIG. 1 is a block diagram of an exemplary digital camera which implements the method and incorporates the apparatus of the present invention. The digital camera 30 produces digital images that are stored on the removable memory card 74. The digital camera 30 includes a lens 32 having an aperture motor drive 34 and a shutter motor drive 35 and an electrically adjustable aperture 33 and an electrically driven mechanical shutter 36. The lens 32 focuses light from a scene (not shown) on an image sensor 40, for example, a single-chip color CCD image sensor, using the well known Bayer color filter pattern. The aperture 33, shutter 36, and image sensor 40 are controlled by respective drivers 34, 35 and 42. The drivers 34, 35 and 42 are controlled by control signals supplied by a a control interface processor 62. In the case of drivers 34 and 35, these signals are supplied via a Photo Systems Interface 37, as shown in the figure.

The control interface processor 62 receives inputs from the Photo Systems Interface 37. The analog output signal from the image sensor 40 is amplified and converted to digital data by the analog signal processing (ASP) 50 and analog-to-digital (A/D) converter circuit 52. The ASP 50 and A/D 52 include a programmable electrical gain that can be used to adjust the effective ISO speed setting of the camera. This can be done as described in commonly-assigned U.S. Pat. No. 5,610,654, issued Mar. 11, 1997, inventors Parulski et al., the disclosure of which is herein incorporated by reference. The digital data is stored in a DRAM buffer memory 64 and subsequently processed by a digital image processor 66 controlled by the firmware stored in the firmware memory 70, which can be flash EPROM memory. Alternatively, the digital image processor 66 can be provided by custom circuitry (e.g., by one or more custom integrated circuits [ICs] designed only for use in digital cameras), or by a combination of programmable processor(s) and custom circuits.

The processed digital image file is provided to a memory card interface 72 which stores the digital image file on the removable memory card 74. Removable memory cards 74 are known to those skilled in the art. For example, the removable memory card 74 can include memory cards adapted to the PCMCIA card interface standard, as described in the PC Card Standard, Release 2.0, published by the Personal Computer Memory Card International Association (PCMCIA), Sunnyvale, Calif., September 1991, or to the *CompactFlash Specification Version* 1.3, published by the CompactFlash Association, Palo Alto, Calif., Aug. 5, 1998. Other types of removable memory cards, including Smart Memory cards, Secure Digital (SD) cards, and Memory Stick cards, or other types of digital memory devices, such as magnetic hard drives, magnetic tape, or optical disks, could alternatively be used to store the digital images.

In some embodiments, the digital image processor 66 performs color interpolation followed by color and tone correction, in order to produce rendered sRGB image data. The rendered sRGB image data is then JPEG compressed and stored as a JPEG image file on the removable memory card 74. In other embodiments, the processor directly compressed data on the removable memory card 74, and the image is later "finished" by processing the compressed Bayer color image data using the host PC 80.

The processor 66 also creates a "thumbnail" size image that is stored in RAM memory 68 and supplied to the color LCD image display 78, which displays the captured image for the user to review. Instead of a color LCD image display, the digital camera 30 could use an organic light emitting diode (OLED) display, or many other types of image displays. The thumbnail image can be created as described in commonly-assigned U.S. Pat. No. 5,164,831, issued Nov. 17, 1992, inventors Kuchta et al., the disclosure of which is herein incorporated by reference. The graphical user interface displayed on the color LCD image display 78 is controlled by the user interface portion of the firmware stored in the firmware memory 70.

After a series of images have been taken and stored on the removable memory card 74, the removable memory card 74 can be inserted into a card reader (not shown) in host PC 80. Alternatively, an interface cable 77 can be used to connect between the interface 76 in the digital camera 30 and the host PC 80. The interface cable 77 can conform to, for example, that well known IEEE 1394 interface specification, the universal serial bus (USB) interface specification, or other wired or wireless interface specifications.

Alternatively, the digital camera 30 could be comprised of a digital back for a 35 mm or medium format film camera. In this case, the lens 32, aperture 34, shutter 36 are provided as part of the film camera body, and the other components, including the image sensor 40, image processor 66 and color LCD image display 78, are provided as part of a separate digital camera back that is connected to the film camera body. The connection preferably includes an electrical connector (not shown), so that the lens 32, aperture 33, and shutter 36 can be controlled by the control interface processor 62 in the digital back.

According to the present invention there is provided a method and apparatus for automatically calibrating a digital camera for linearity, color, white balance and exposure. In the digital image processing path, the ultimate image quality is achieved when the processing of the images can occur with the most recent data applied in the processing path. Because of this fact, the data that occurs most recently is the data that is best for the particular capture that is being used for processing. However, there are many workflow considerations that must be overcome in order to use each individual image for processing of its data. Therefore, the next best thing is to utilize the information for processing of a set of images. This can be accomplished by capturing an image, under the conditions that are most like those of the images to be captured. The information from this one capture can be extracted and properly analyzed and then applied to the subsequent images to achieve images that have exceptional image quality under a variety of illuminants.

In general, according to the present invention, digital camera 30 user captures a color chart (e.g., small MacBeth 100 in FIG. 2) under the illuminant or in the venue used to capture subsequent images. From the neutral patch data 102 on the chart, the camera firmware 66, 70 will extract information to adjust exposure, white balance and linearity. With the color patch data 106, the camera firmware 66, 70 will regress the captured patch data with the reference patch data. The outcome of the regression will be either an ICC (International Color Consortium) profile or a color matrix that will colorimetrically balance the image for that set of conditions that the images are captured under. The known values for the color chart 100 are stored in firmware memory 70 and are used with the values determined from the imaged color chart 100 to effect the method of the present invention by digital image processor 66.

The invention affords the user a unique opportunity and huge workflow savings in utilizing the patch data from a known chart to effect many important items in the digital processing workflow. This technique could be used for scanners as well as printers.

The exposure and white balance correction will be determined based upon the middle gray patch 104 of the color target 100. Since the patch 104 is neutral, the factory determined exposure level is known and used to calculate how far over/under exposed the image may be. From this determination, the software will automatically adjust the image data to render a proper exposure. Equation 1a provides an equation for the determination of the exposure level. While equation 1b shows how the image data would be automatically corrected based upon the value from equation 1a.

$$\text{stops from MidGray} = \log_{10}\left(\frac{\frac{\text{Value}}{\text{MidGray}}}{\log_{10} 2}\right) \quad (1a)$$

where MidGray is factory determined proper exposure level for that patch (1b)

Figure 2:
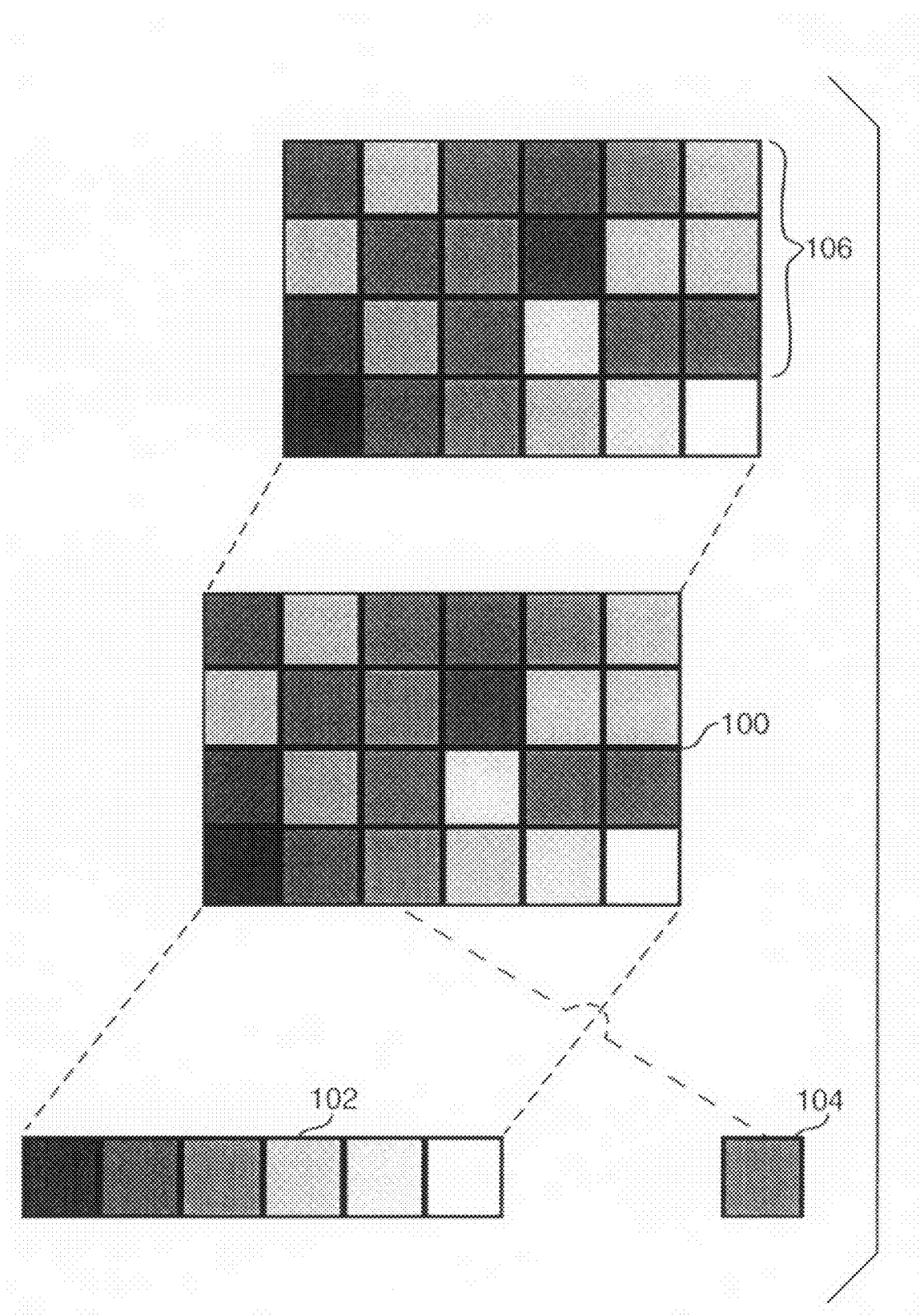
FIG. 2 is a diagrammatic view of an exemplary color chart which can be used carrying out the present invention.

Exposure Correction=$2^{\text{Stops from MidGray}}$ where MidGray is factory determined proper exposure level for that patch The white balance correction will also be determined from the middle gray patch 104 (FIG. 2). Since the patch 104 is neutral, the color of the illuminant, from a red, green, blue, perspective will be known be analyzing the red, green, blue values of the gray patch. Once these values are determined, channel gains can be calculated to be applied to the red, green and blue channels of the image, respectively. Equation 2a shows how the channel gains are calculated and equation 2b shows how the gains are applied automatically to the respective red, green and blue channels.

$$Red_{gain} = Max_{channel}/Red_{Avg}$$

$$Green_{gain} = Max_{channel}/Green_{Avg}$$

$$Blue_{gain} = Max_{channel}/Blue_{Avg} \quad (2a)$$

where $Max_{channel}$=Maximum (Red, Green, Blue)

$$Red_{corr} = RedLut[Red_{value}]$$

$$Green_{corr} = GreenLut[Green_{value}]$$

$$Blue_{corr} = BlueLut[Blue_{value}] \quad (2b)$$

where RedLut, GreenLut, BlueLut are determined by multiplying the gains calculated from 2a by a linear curve In order to enhance the image quality of the captured image, it is vital that the tonescale of the image be linear. The concept of CCDs is that they produce a linear output relative to exposure. However, to the extent that the linear paradigm is not held, color performance and therefore image quality will be hindered.

The other issue with linearity is that as the ISO speed of the camera is increased the linearity of the device can suffer. Therefore, having the ability to linearize the image, with actual image data, will be important for establishing an efficient workflow.

Figure 3:
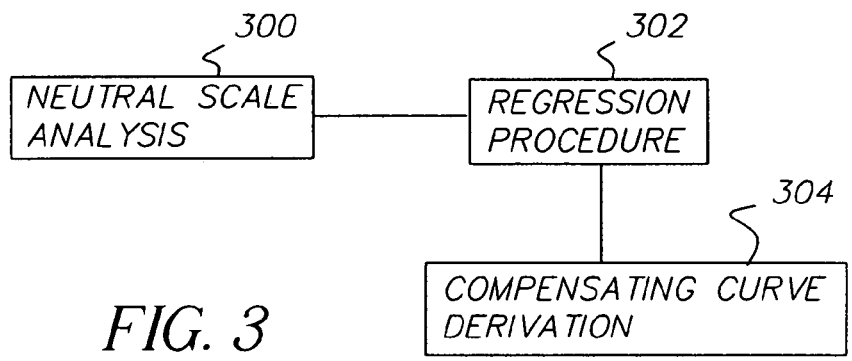
FIG. 3 is a flow diagram of a method for deriving linearity correction according to the invention.
Figure 4:
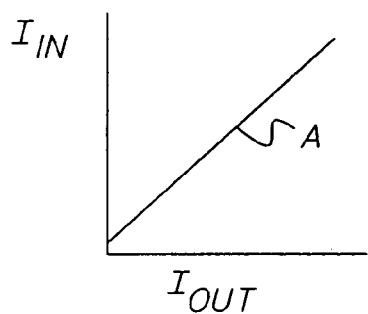
FIGS. 4(a) and 4(b) are graphical views illustrating linearity correction according to the invention.
Figure 4:
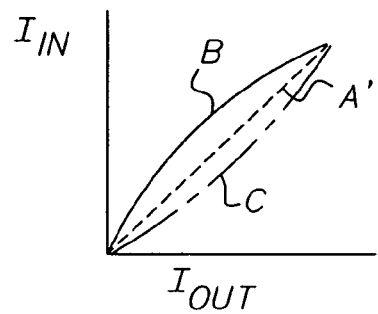

From the neutral scale 102 on the color chart 100, the linearity correction will be determined. The means of determining the correction is shown in the flow diagram in FIG. 3. The neutral scale analysis 300 will show the level of non-linearity existent in the image for the particular capture conditions. Therefore, after a regression procedure 302, a compensating curve is derived 304 that is the opposite of the curve that is shown via the neutral scale. The effect of the characteristic neutral scale based on the capture conditions, combined with the compensating curve will yield a linear neutral scale that will allow for much better image quality. This is illustrated in FIGS. 4(a) and 4(b). FIG. 4(a) shows a linear curve A between image $I_{in}$ and $I_{out}$. In FIG. 4(b), curve B shows an imaged non-linear curve B, a derived compensation curve C, and corrected linear curve A'.

The color correction of a digital image is the most critical part of the image processing path. It relies heavily on exposure, white balance and linearity, however, without the proper color correction, the image will be unacceptable for customer usage. The competitive advantage for Kodak lies in its ability to manipulate color.

Figure 5:
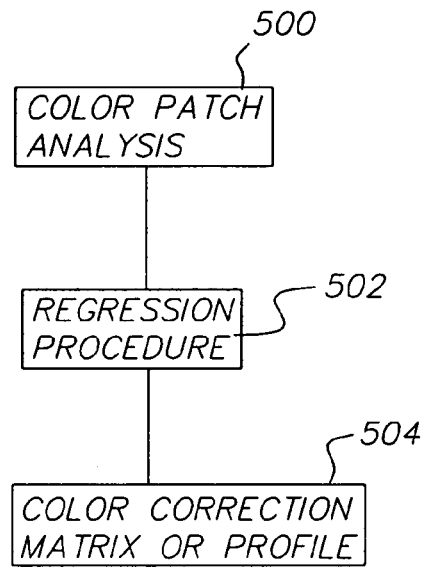
FIG. 5 is a flow diagram of a method for determining color correction according to the invention.

The color chart 106 shown in FIG. 2 can be used to assess the color that the camera "sees" and correct it for the color that the camera should "see". This can be done on a venue basis. If the capture conditions are not changing, then the color correction that is done will be useful for all scenes captured under those conditions. The workflow for the user is greatly enhanced because of the fact that the user can get color balanced images in the camera, and thereby reducing the time needed in the back-end processing. The flow diagram in FIG. 5 shows the flow that is used to determine the color correction parameters needed for proper color reproduction. First the color patch image data is analyzed (500) and then through a regression procedure (502) using the known color patch values and the imaged color patch values, a color correction matrix or profile is derived (504). The outcome of this process can be either a 3×3 matrix applied to the RGB data or it can be an ICC profile that is applied to the RGB data.

The invention has been described in detail with particular reference to certain preferred embodiments thereof, but it will be understood that variations and modifications can be effected within the spirit and scope of the invention.

PARTS LIST 30 digital camera
32 lens
33 adjustable aperture
34 aperture driver
35 shutter motor drive
36 mechanical shutter
37 Photo Systems Interface
40 image sensor
42 driver
50 analog Gain & CDS
52 A/D converter circuit
62 control interface processor
64 DRAM buffer memory
66 digital image processor
68 RAM
70 firmware memory
72 memory card interface
74 removable memory card
76 interface
77 interface cable
78 LCD
80 PC host computer
100 enhanced color chart
102 neutral patch data
104 middle gray patch
106 color chart
300 neutral scale analysis
302 regression procedure
304 compensating curve derivation
500 color patch analysis
502 regression procedure
504 color correction matrix or profile

What is claimed is:

1. A method of improving a digital image captured by a digital camera comprising:

providing a digital camera having a memory for storing known values of a color chart having a plurality of color patches of different colors and a digital image processor;

using said digital camera to capture an image of said color chart to produce imaged values of said color patches of said color chart;

operating said digital image processor to process at least some of said color patch imaged values and said stored known values of said color patches to produce a color correction matrix or profile in said digital camera;

storing said color correction matrix or profile to correct color images subsequently acquired by said digital camera; and wherein said stored known values of said color chart include a value of a neutral middle gray patch, wherein said captured image of said color chart includes a corresponding neutral middle gray patch value, and wherein said digital image processor processes said stored known and imaged values of said neutral middle gray patch to derive an exposure correction that is stored for correcting exposure of subsequently acquired images by said digital camera.

2. A method of improving a digital image captured by a digital camera comprising:

providing a digital camera having a memory for storing known values of a color chart having a plurality of color patches of different colors and a digital image processor;

using said digital camera to capture an image of said color chart to produce imaged values of said color patches of said color chart;

operating said digital image processor to process at least some of said color patch imaged values and said stored known values of said color patches to produce a color correction matrix or profile in said digital camera;

storing said color correction matrix or profile to correct color images subsequently acquired by said digital camera; and wherein said stored known values of said color chart include a value of a neutral middle gray patch, wherein said captured image of said color chart includes a corresponding neutral middle gray patch value, and wherein said digital image processor processes said stored known and imaged values of said neutral middle gray patch to derive a white balance correction that is stored for correcting subsequently acquired images by said digital camera.

3. A method of improving a digital image captured by a digital camera comprising:

providing a digital camera having a memory for storing known values of a color chart having a plurality of color patches of different colors and a digital image processor;

using said digital camera to capture an image of said color chart to produce imaged values of said color patches of said color chart;

operating said digital image processor to process at least some of said color patch imaged values and said stored known values of said color patches to produce a color correction matrix or profile in said digital camera;

storing said color correction matrix or profile to correct color images subsequently acquired by said digital camera; and wherein said stored known values of said color chart include a set of values of a neutral scale set of patches, wherein said captured image of said color chart includes a corresponding set of values of a neutral scale set of patches, and wherein said digital image processor processes said stored known and imaged values of said neutral scale set of patches to derive a linearity correction that is stored for correcting subsequently acquired images by said digital camera.

4. A method of improving a digital image captured by a digital camera comprising:

providing a digital camera having a memory for storing known values of a color chart having a plurality of color patches of different colors and a neutral scale set of patches including a neutral middle gray patch, and further having a digital image processor;

using said digital camera to capture an image of said color chart to produce imaged values of said color patches of said color chart, of said neutral scale set of patches of said color chart, and of said neutral middle gray patch of said color chart;

operating said digital image processor to process (a) at least some of said color patch imaged values and said stored known values of said color patches to produce a color correction matrix or profile;

(b) said stored known and imaged values of said neutral middle gray patch to derive an exposure correction and a white balance correction; and (c) said stored known and imaged values of said neutral scale set of patches to derive a linearity correction; and storing said color correction matrix or color profile, said exposure correction, said white balance correction, and said linearity correction for correcting color, exposure, white balance, and linearity of a subsequently acquired image by said digital camera.

5. A digital camera comprising;

a memory for storing known values of a color chart having a plurality of color patches of different colors;

an image capture device for capturing an image of said color chart to produce imaged values of said color patches of said color chart; and a digital image processor for processing at least some of said color patch imaged values and said stored known values of said color patches to produce a color correction matrix or profile in said digital camera;

wherein said color correction matrix or profile is stored in said memory to color correct images subsequently captured by said image capture device;

wherein said stored known values of said color chart in said memory include a value of a neutral middle gray patch;

wherein said image of said color chart captured by said image capture device includes a corresponding neutral middle gray patch value; and wherein said digital image processor processes said stored known and imaged values of said neutral middle gray patch to derive one or more of an exposure correction and white balance correction and wherein said derived exposure correction and white balance correction is stored in said memory to correct images subsequently captured by said image capture device.

6. A digital camera comprising:

a memory for storing known values of a color chart having a plurality of color patches of different colors;

an image capture device for capturing an image of said color chart to produce imaged values of said color patches of said color chart; and a digital image processor for processing at least some of said color patch imaged values and said stored known values of said color patches to produce a color correction matrix or profile in said digital camera;

wherein said color correction matrix or profile is stored in said memory to color correct images subsequently captured by said image capture device;

wherein said stored known values of said color chart in said memory include a set of values of a neutral scale set of patches, wherein said captured image of said color chart includes a corresponding set of values of a neutral scale set of patches; and wherein said digital image processor processes said stored known and imaged values of said neutral scale set of patches to derive a linearity correction that is stored in said memory for correcting images subsequently acquired by said image acquisition device.

* * * * *